US010202949B2

(12) United States Patent
Suzuki

(10) Patent No.: US 10,202,949 B2
(45) Date of Patent: Feb. 12, 2019

(54) CONTROL DEVICE FOR VEHICLE HAVING A RELIEF VALVE

(71) Applicant: Toyota Jidosha Kabushiki Kaisha, Toyota-shi, Aichi-ken (JP)

(72) Inventor: Takashi Suzuki, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 121 days.

(21) Appl. No.: 14/922,700

(22) Filed: Oct. 26, 2015

(65) Prior Publication Data
US 2016/0146171 A1 May 26, 2016

(30) Foreign Application Priority Data
Nov. 21, 2014 (JP) .................................. 2014-236447

(51) Int. Cl.
F02M 37/00 (2006.01)
B60W 20/10 (2016.01)
(Continued)

(52) U.S. Cl.
CPC ........ *F02M 37/0029* (2013.01); *B60W 20/10* (2013.01); *B60W 20/15* (2016.01); *F02M 63/024* (2013.01)

(58) Field of Classification Search
CPC ........... F02M 37/0023; F02M 37/0029; F02M 37/0052; F02M 37/0058; F02M 51/02; F02M 63/023; F02M 63/0235; F02M 63/024; F02D 41/08; F02D 41/083; F02D 41/16; F02D 41/3836–41/3863; F02D 31/008; F02D 41/123; F02D 41/3094–41/365; F02D 2009/0245; B60W 10/04–10/08; B60W 20/00–20/11; B60W 20/13; B60W 30/18; B60W 30/1882; B60W 30/192; B60W 2510/0625; B60W 2510/244; B60W 2710/065; B60W 2710/244
(Continued)

(56) References Cited

U.S. PATENT DOCUMENTS 5,550,445 A * 8/1996 Nii .......................... B60K 6/46
180/65.245
5,785,025 A * 7/1998 Yoshiume ............. F02D 33/003
123/458
(Continued)

FOREIGN PATENT DOCUMENTS

JP 58057047 A * 4/1983 ............. F02D 17/02
JP 2001-317389 A 11/2001
(Continued)

*Primary Examiner* — Erick R Solis
*Assistant Examiner* — Robert A Werner
(74) *Attorney, Agent, or Firm* — Dinsmore & Shohl LLP

(57) ABSTRACT

A control device for a vehicle includes a low-pressure fuel sensor that detects a pressure of fuel stored in a low-pressure delivery pipe, and a control device that controls a feed pump based on a detected value from the low-pressure fuel sensor. The control device causes a relief valve to be opened when variation in power required in an engine continues to remain within a prescribed range for a prescribed period. With this structure, a control device for a vehicle can be provided which allows the relief valve to be opened with reduced variation in air-fuel ratio.

2 Claims, 4 Drawing Sheets

(51) Int. Cl.
*B60W 20/15* (2016.01)
*F02M 63/02* (2006.01)

(58) Field of Classification Search
USPC ......... 701/104; 123/506, 510–514, 325, 332, 123/198 DB
See application file for complete search history.

(56) References Cited

U.S. PATENT DOCUMENTS

| | | | | |
|---|---|---|---|---|
| 6,659,213 | B2* | 12/2003 | Kubo | B60K 6/28 |
| | | | | 180/65.26 |
| 6,895,936 | B2* | 5/2005 | Kuroda | F02M 63/025 |
| | | | | 123/446 |
| 7,343,901 | B2* | 3/2008 | Mori | F02M 37/22 |
| | | | | 123/446 |
| 2001/0042535 | A1 | 11/2001 | Yamazaki et al. | |
| 2004/0226541 | A1* | 11/2004 | Crary | F02M 37/0023 |
| | | | | 123/460 |
| 2007/0235006 | A1* | 10/2007 | Nishigaki | F02D 31/003 |
| | | | | 123/339.1 |

FOREIGN PATENT DOCUMENTS

| | | |
|---|---|---|
| JP | 2006-193137 A | 7/2006 |
| JP | 2009-248682 A | 10/2009 |
| JP | 2009-279987 A | 12/2009 |
| JP | 2010-169022 A | 8/2010 |
| JP | 2012-132358 A | 7/2012 |
| JP | 2013-231362 A | 11/2013 |
| JP | 2013-253574 A | 12/2013 |
| JP | 2014-121976 A | 7/2014 |

\* cited by examiner

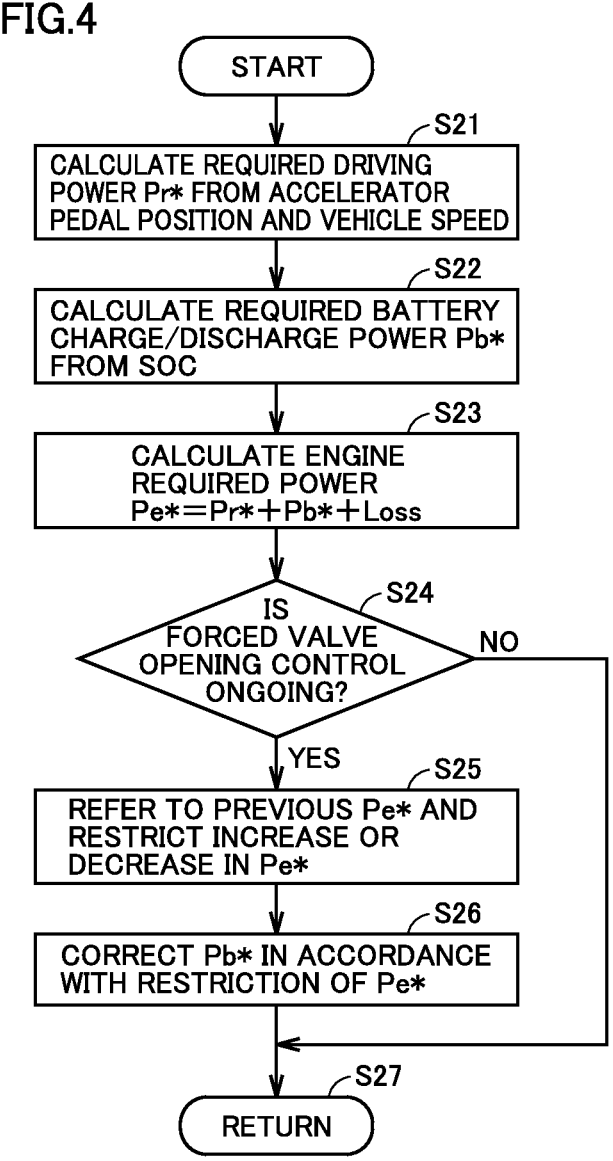

CONTROL DEVICE FOR VEHICLE HAVING A RELIEF VALVE

This nonprovisional application is based on Japanese Patent Application No. 2014-236447 filed on Nov. 21, 2014, with the Japan Patent Office, the entire contents of which are hereby incorporated by reference.

BACKGROUND OF THE INVENTION

Field of the Invention

This invention relates to a control device for a vehicle, and particularly to a control device for a vehicle equipped with an internal combustion engine including port injection valves that inject fuel into an intake passage.

Description of the Background Art

Japanese Patent Laying-Open No. 2013-253574 describes an internal combustion engine including port injection valves and in-cylinder injection valves, wherein a switching operation for a return valve is performed in order to prevent seizure of the return valve disposed along a return pipe of a fuel system in which fuel is supplied to the in-cylinder injection valves. This switching operation is executed when an injection ratio of fuel from the in-cylinder injection valves (DI ratio) is 100%.

For a low pressure fuel system in which fuel is supplied into the port injection valves, the pressure regulator method has been conventionally used. In order to improve fuel efficiency, however, the use of a variable fuel pressure system with less energy loss has been considered.

In the pressure regulator method, the pressure of the fuel is stabilized by excessively pressurizing the fuel with a fuel pump, and discharging part of the fuel through a pipe using a pressure regulator valve. On the other hand, in the variable fuel pressure system, which has improved accuracy of pressurizing the fuel pump, fuel may be directly supplied to the fuel pipe without using the pressure regulator valve.

In the variable fuel pressure system, a relief valve is provided instead for protecting against an abnormal increase in the pressure of the fuel. While this relief valve is normally not opened and remains closed, it is necessary to perform a switching operation with an appropriate frequency for preventing seizure of the relief valve.

Although Japanese Patent Laying-Open No. 2013-253574 described above relates to the switching operation for the return valve of a high pressure fuel system of the in-cylinder injection valves, it mentions nothing of the relief valve for the port injection valves, and requires consideration of under what conditions the relief valve is to be opened or closed. While it is necessary to increase the pressure of the fuel for opening the relief valve, when the relief valve is opened or closed, the fuel pressure may vary to cause a disturbance in the air-fuel ratio of the fuel.

SUMMARY OF THE INVENTION

An object of this invention is to provide a control device for a vehicle which allows a relief valve to be opened with reduced variation in air-fuel ratio.

This invention relates to a control device for a vehicle equipped with an internal combustion engine. The internal combustion engine includes a port injection valve that injects fuel into an intake passage, a fuel tank that stores the fuel to be injected from the port injection valve, a feed pump that sucks the fuel from the fuel tank and supplies the fuel to the port injection valve, and a relief valve that is provided along a path from the feed pump to the port injection valve to return the fuel to the fuel tank. The control device for a vehicle includes a fuel pressure sensor that detects a pressure of the fuel supplied to the port injection valve, and a control unit that controls the feed pump based on a detected value from the fuel pressure sensor. The control unit causes the relief valve to be opened when variation in power required in the internal combustion engine continues to remain within a prescribed range for a prescribed period.

Through this control, the relief valve is opened while avoiding a case where the variation in the power required in the internal combustion engine is large. Therefore, the two factors responsible for fuel pressure variation, i.e., the opening of the relief valve and the variation in the required power, do not occur concurrently. The variation in the fuel pressure can thus be minimized, which allows the stability of the air-fuel ratio to be improved, and exhaust deterioration to be prevented.

Preferably, the vehicle is further equipped with a battery and a motor that receives electric power from the battery to drive the vehicle. The control unit, during the execution of opening of the relief valve, determines a required charge/discharge amount for the battery such that the variation in the power required in the internal combustion engine is restricted.

Through this control, the variation in the required power for the internal combustion engine is restricted even after the opening of the relief valve is started. Therefore, during the period in which the relief valve is opened, the two factors responsible for fuel pressure variation, i.e., the opening of the relief valve and the variation in the required power, do not occur concurrently. The variation in the fuel pressure can thus be minimized, which allows the stability of the air-fuel ratio to be improved, and exhaust deterioration to be prevented.

Preferably, the relief valve is configured to open when a pressure applied to the fuel by the feed pump reaches an opening pressure. The control unit causes the relief valve to be opened by controlling the feed pump such that the pressure of the fuel applied to the relief valve reaches the opening pressure.

According to the invention, the relief valve can be opened with reduced variation in air-fuel ratio.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart for explaining control of reducing the variation in engine required power Pe* during opening of relief valve 515.

DESCRIPTION OF THE PREFERRED EMBODIMENTS

Figure 1:
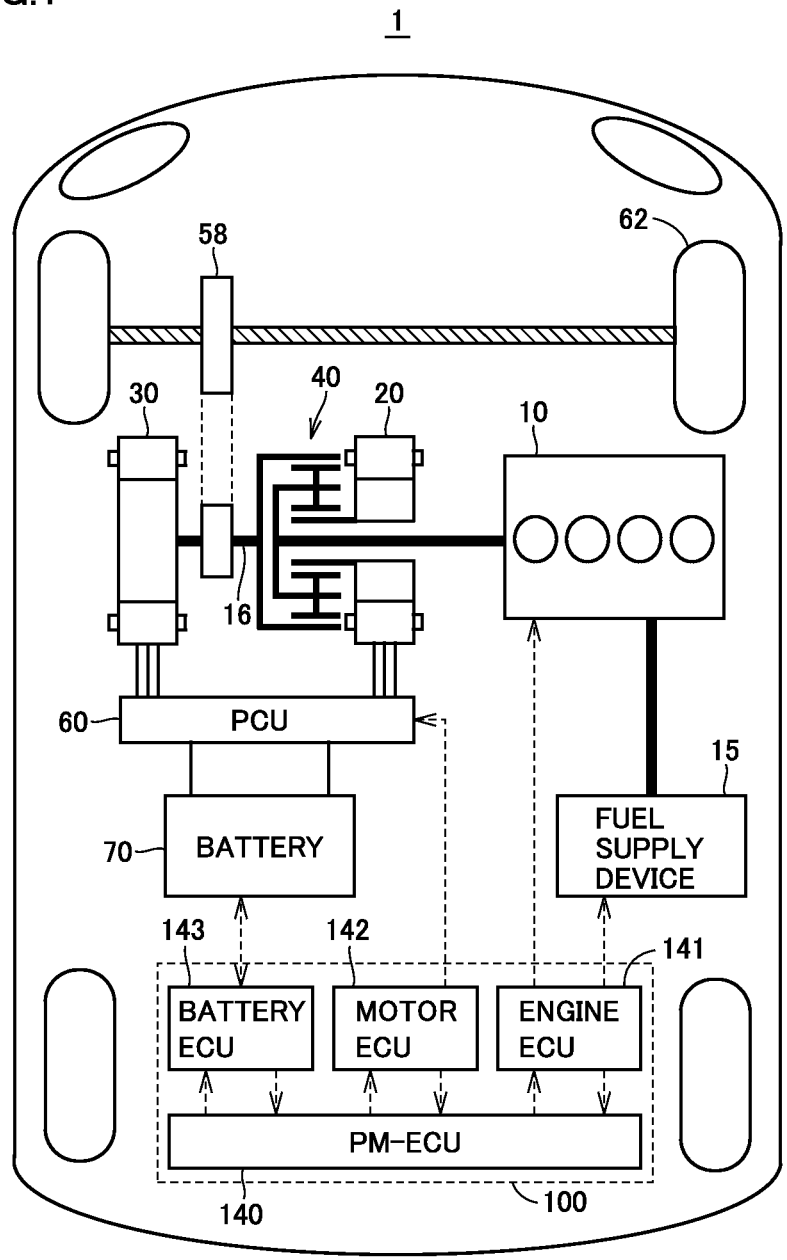
FIG. 1 is a block diagram showing the configuration of a hybrid vehicle 1 to which the present invention is applied.

Embodiments of the present invention will be described below in detail with reference to the drawings, in which the same or corresponding elements are designated by the same reference characters, and description thereof will not be repeated.

(Description of Basic Configuration)

FIG. 1 is a block diagram showing the configuration of hybrid vehicle 1 to which the present invention is applied. Referring to FIG. 1, hybrid vehicle 1 includes engine 10, fuel supply device 15, motor generators 20 and 30, a power split device 40, a reduction mechanism 58, a driving wheel 62, a power control unit (PCU) 60, a battery 70, and a control device 100.

Hybrid vehicle 1 is a series/parallel-type hybrid vehicle, and is configured to be capable of running using at least one of engine 10 and motor generator 30 as a driving source.

Engine 10, motor generator 20, and motor generator 30 are coupled to one another via power split device 40. Reduction mechanism 58 is connected to a rotation shaft 16 of motor generator 30, which is coupled to power split device 40. Rotation shaft 16 is coupled to driving wheel 62 via reduction mechanism 58, and is coupled to a crankshaft of engine 10 via power split device 40.

Power split device 40 is capable of splitting the driving force of engine 10 for motor generator 20 and rotation shaft 16. Motor generator 20 can function as a starter for starting engine 10 by rotating the crankshaft of engine 10 via power split device 40.

Motor generators 20 and 30 are both well-known synchronous generator motors that can operate both as power generators and electric motors. Motor generators 20 and 30 are connected to PCU 60, which in turn is connected to battery 70.

Control device 100 includes an electronic control unit for power management (hereinafter referred to as "PM-ECU") 140, an electronic control unit for the engine (hereinafter referred to as "engine ECU") 141, an electronic control unit for the motors (hereinafter referred to as "motor ECU") 142, and an electronic control unit for the battery (hereinafter referred to as "battery ECU") 143.

PM-ECU 140 is connected to engine ECU 141, motor ECU 142, and battery ECU 143, via a communication port (not shown). PM-ECU 140 exchanges various control signals and data with engine ECU 141, motor ECU 142, and battery ECU 143.

Motor ECU 142 is connected to PCU 60 to control driving of motor generators 20 and 30. Battery ECU 143 calculates a remaining capacitance (hereinafter referred to as SOC (State of Charge)), based on an integrated value of charge/discharge current of battery 70.

Engine ECU 141 is connected to engine 10 and fuel supply device 15. Engine ECU 141 receives input of signals from various sensors that detect an operation state of engine 10, and performs operation control such as fuel injection control, ignition control, intake air amount regulation control, and the like, in response to the input signals. Engine ECU 141 also controls fuel supply device 15 to supply fuel to engine 10.

In hybrid vehicle 1 having the above-described configuration, the configuration and control of engine 10 and fuel supply device 15 will be described in more detail.

Figure 2:
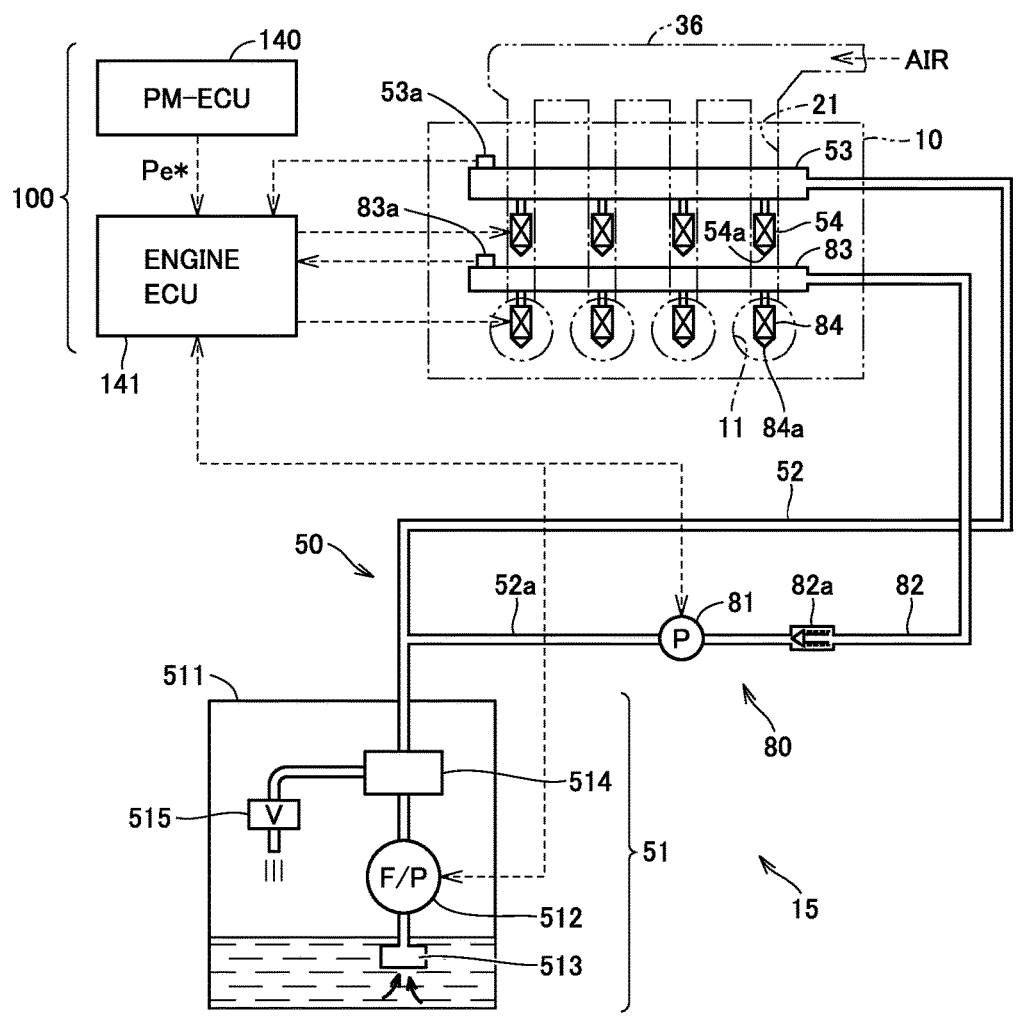
FIG. 2 is a diagram showing the configuration of an engine 10 and a fuel supply device 15 concerning fuel supply.

FIG. 2 is a diagram showing the configuration of engine 10 and fuel supply device 15 concerning fuel supply. In this embodiment, the vehicle to which the invention is applied is a hybrid vehicle that adopts, as an internal combustion engine, a dual injection-type internal combustion engine using both in-cylinder injection and port injection, for example, a serial four-cylinder gasoline engine.

Referring to FIG. 2, engine 10 includes an intake manifold 36, an intake port 21, and four cylinders 11 provided in a cylinder block.

When a piston (not shown) is lowered in each cylinder 11, intake air AIR flows into each cylinder 11 from an intake port pipe by way of intake manifold 36 and intake port 21.

Fuel supply device 15 includes a low-pressure fuel supply mechanism 50 and a high-pressure fuel supply mechanism 80. Low-pressure fuel supply mechanism 50 includes a fuel pumping section 51, a low-pressure fuel pipe 52, low-pressure delivery pipe 53, low-pressure fuel sensor 53a, and port injection valves 54.

High-pressure fuel supply mechanism 80 includes a high-pressure pump 81, a check valve 82a, a high-pressure fuel pipe 82, a high-pressure delivery pipe 83, a high-pressure fuel sensor 83a, and in-cylinder injection valves 84.

Each in-cylinder injection valve 84 is an injector for in-cylinder injection having a nozzle hole 84a exposed within the combustion chamber of each cylinder 11. During a valve-opening operation of each in-cylinder injection valve 84, fuel pressurized within high-pressure delivery pipe 83 is injected into combustion chamber 16 from nozzle hole 84a of in-cylinder injection valve 84.

Engine ECU 141 is configured to include a CPU (Central Processing Unit), a ROM (Read Only Memory), a RAM (Random Access Memory), an input interface circuit, an output interface circuit, and the like. Engine ECU 141 controls engine 10 and fuel supply device 15 in response to an engine start/shutdown command from PM-ECU shown in FIG. 1.

Engine ECU 141 calculates a fuel injection amount required for every combustion cycle based on the accelerator pedal position, the intake air amount, the engine speed, and the like. Engine ECU 141 also outputs an injection command signal or the like to each port injection valve 54 and each in-cylinder injection valve 84, at an appropriate time, based on the fuel injection amount calculated.

At the start of engine 10, engine ECU 141 causes port injection valves 54 to perform fuel injection first. ECU 140 then begins to output an injection command signal to each in-cylinder injection valve 84 when the fuel pressure within high-pressure delivery pipe 83 detected by high-pressure fuel sensor 83a has exceeded a preset pressure value.

Furthermore, while engine ECU 141 basically uses in-cylinder injection from in-cylinder injection valves 84, for example, it also uses port injection under a specific operation state in which in-cylinder injection does not allow sufficient formation of an air-fuel mixture, for example, during the start and the warm-up of engine 10, or during rotation of engine 10 at low speed and high load. Alternatively, while engine ECU 141 basically uses in-cylinder injection from in-cylinder injection valves 84, for example, it also causes port injection from port injection valves 54 to be performed when port injection is effective, for example, during rotation of engine 10 at high speed and low load.

In this embodiment, fuel supply device 15 has a feature in that the pressure of low-pressure fuel supply mechanism 50 is variably controllable. Low-pressure fuel supply mechanism 50 of fuel supply device 15 will be described below in more detail.

Fuel pumping section 51 includes a fuel tank 511, a feed pump 512, a suction filter 513, a fuel filter 514, and a relief valve 515.

Fuel tank 511 stores a fuel consumed by engine 10, for example, gasoline. Suction filter 513 prevents suction of foreign matter. Fuel filter 514 removes foreign matter contained in discharged fuel.

Relief valve 515 opens when the pressure of the fuel discharged from feed pump 512 reaches an upper limit pressure, and remains closed while the pressure of the fuel is below the upper limit pressure.

Low-pressure fuel pipe 52 connects from fuel pumping section 51 to low-pressure delivery pipe 53. Note, however, that low-pressure fuel pipe 52 is not limited to a fuel pipe, and may also be a single member through which a fuel passage is formed, or may be a plurality of members having a fuel passage formed therebetween.

Low-pressure delivery pipe 53 is connected to low-pressure fuel pipe 52 on one end thereof in a direction of the arrangement of cylinders 11 in series. Port injection valves 54 are connected to low-pressure delivery pipe 53. Low-pressure delivery pipe 53 is equipped with low-pressure fuel sensor 53a that detects an internal fuel pressure.

Each port injection valve 54 is an injector for port injection having a nozzle hole 54a exposed within intake port 21 corresponding to each cylinder 11. During a valve-opening operation of each port injection valve 54, fuel pressurized within low-pressure delivery pipe 53 is injected into intake port 21 from nozzle hole 54a of port injection valve 54.

Feed pump 512 is driven or stopped based on a command signal sent from engine ECU 141.

Feed pump 512 is capable of pumping up fuel from fuel tank 511, and pressurizing the fuel to a pressure in a certain variable range of less than 1 [MPa: megapascal], for example, and discharging the fuel. Feed pump 512 is also capable of changing the amount of discharge [m$^3$/sec] and the discharge pressure [kPa: kilopascal] per unit time, under the control of engine ECU 141.

This control of feed pump 512 is preferable in the following respects. Firstly, in order to prevent gasification of the fuel inside low-pressure delivery pipe 53 when the engine is heated to a high temperature, it is necessary to exert a pressure on low-pressure delivery pipe 53 beforehand such that the fuel does not gasify. An excessive pressure, however, will cause a great load on the pump, leading to a large energy loss. Since the pressure for preventing gasification of the fuel changes depending on the temperature, energy loss can be reduced by exerting a required pressure on low-pressure delivery pipe 53. Secondly, wasteful consumption of energy for pressurizing the fuel can be reduced by controlling feed pump 512 appropriately to deliver an amount of fuel corresponding to an amount of fuel consumed by the engine. This is advantageous in that the fuel efficiency is improved over a configuration in which the fuel is excessively pressurized and then the fuel pressure is adjusted to be constant with a pressure regulator.

[Explanation of Control of Opening of Relief Valve]

In the hybrid vehicle equipped with the internal combustion engine described above, relief valve 515 does not open during normal engine operation. If, however, relief valve 515 continues to remain in a closed state, relief valve 515 may be seized. Thus, during a period from the start of the vehicle to the completion of running (hereinafter referred to as "one trip"), it is desirable to open relief valve 515 at least once.

In order to open relief valve 515, however, it is necessary to create a higher-than-normal pressure in feed pump 512 to increase the pressure of the fuel. When relief valve 515 is opened or closed, the fuel pressure may vary to cause a disturbance in the air-fuel ratio of the fuel. It is thus necessary to consider in what situations the opening of relief valve 515 is to be executed.

For example, if the fuel pressure is increased once while the engine is stopped, the pressure in low-pressure delivery pipe 53 remains elevated, and the control of the fuel pressure cannot be performed freely. The reason for this is as follows. Because of size reduction and the like in vehicles, a return pipe through which fuel is returned to fuel tank 511 from low-pressure delivery pipe 53 has been out of use. Thus, the only way to lower the fuel pressure is to operate engine 10 to cause the fuel to be injected through port injection valves 54.

Furthermore, when relief valve 515 is opened or closed, the fuel pressure in low-pressure delivery pipe 53 varies, and when the range of variation in the required power for engine 10 is large, the fuel pressure varies even more. If these factors responsible for fuel pressure variation occur concurrently, the degree of deviation of the air-fuel ratio from stoichiometry (theoretical air-fuel ratio) will also increase.

In this embodiment, therefore, the opening of relief valve 515 is executed only in a selected case where engine 10 is being operated and required power for engine 10 is small. Specifically, control device 100 opens relief valve 515 when variation in power Pe* required in engine 10 continues to remain within a prescribed range for a prescribed period. Through this control, relief valve 515 is opened while avoiding a case where the variation in the power required in engine 10 is large. Therefore, the two factors responsible for fuel pressure variation, i.e., the opening of relief valve 515 and the variation in the required power, do not occur concurrently. The variation in the fuel pressure can thus be minimized, which allows the stability of the air-fuel ratio to be improved, and exhaust deterioration to be prevented.

Figure 3:
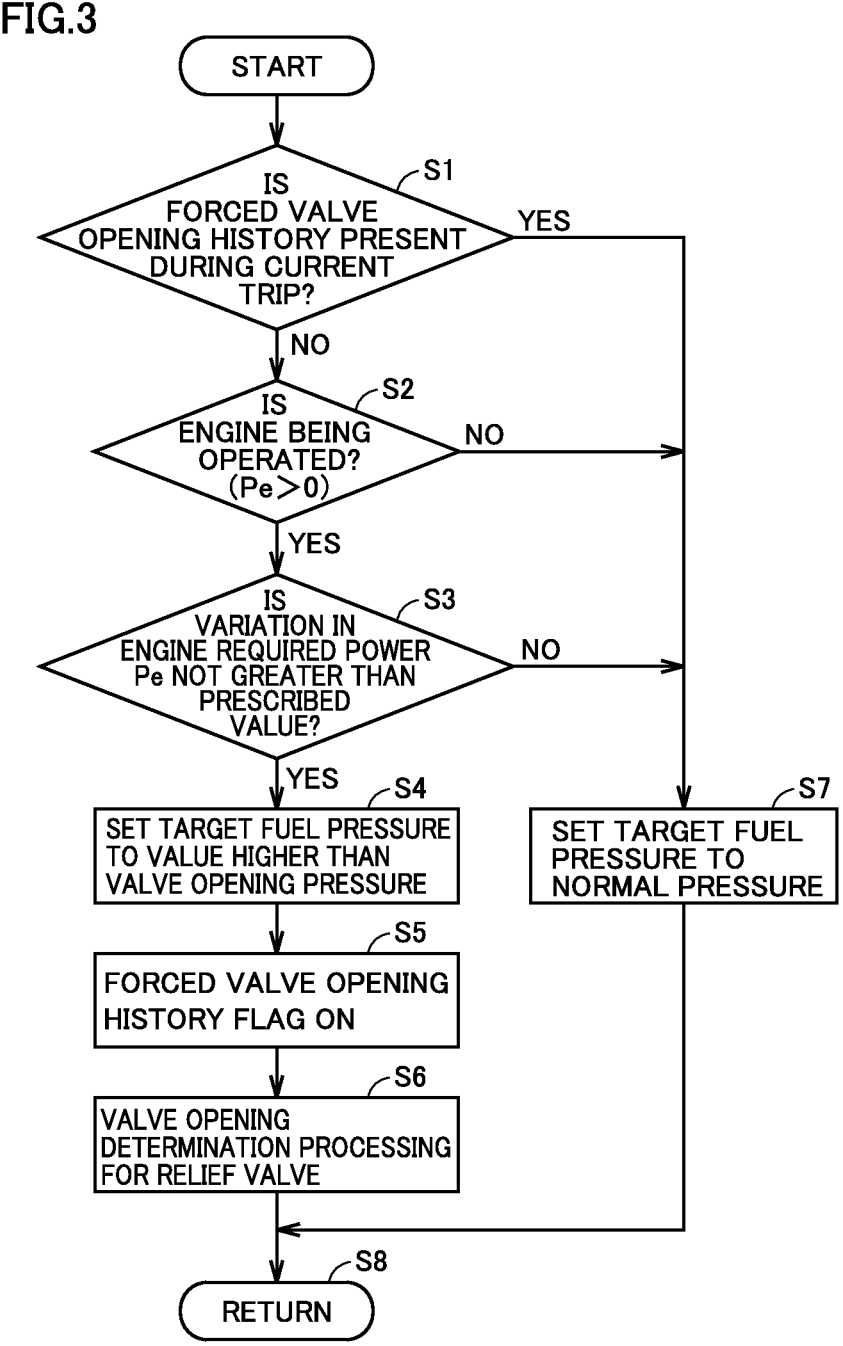
FIG. 3 is a flowchart for explaining control of opening of relief valve 515 executed by control device 100.

FIG. 3 is a flowchart for explaining control of opening of relief valve 515 executed by control device 100. The processing in this flowchart is invoked by control device 100 shown in FIG. 1 at certain intervals or every time a prescribed condition is met, and then executed.

Referring to FIG. 3, control device 100 refers to a forced valve opening history flag described below, and determines whether or not a forced valve opening history for relief valve 515 is present during the current trip. When it is determined in step S1 that the forced valve opening history is present during the current trip (YES in S1), the processing proceeds to step S7. On the other hand, when it is determined that the forced valve opening history for relief valve 515 is not present (NO in S1), the processing proceeds to step S2.

In step S2, it is determined whether or not engine 100 is being operated. During the operation of engine 10, engine 10 is being controlled with respect to fuel injection, ignition, and the like, and therefore, the determination that engine 10 is being operated may be made based on these items. Alternatively, during the operation of engine 10, engine required power Pe*>0 holds, and therefore, the determination that engine 10 is being operated may be made based on the value of engine required power Pe*.

When it is determined in step S2 that engine 10 is being operated (YES in S2), the processing proceeds to step S3, and when it is determined that engine 10 is not being operated (NO in S2), the processing proceeds to step S7.

In step S3, it is determined whether or not the variation in engine required power Pe* within a prescribed period is not greater than a prescribed value. When the variation in engine required power Pe* within a prescribed period (3 seconds, for example) to a current time is not greater than the prescribed value (not greater than 10%, for example), it is determined in step S3 as YES and the processing proceeds to step S4, and if not so, it is determined in step S3 as NO and the processing proceeds to step S7.

In step S7, control device 100 sets the target fuel pressure to a normal pressure (430 kPa, for example). Specifically, control device 100 controls the rotation of feed pump 512 such that a measured value from low-pressure fuel sensor 53a provided on low-pressure delivery pipe 53 becomes the normal pressure.

On the other hand, in step S4, control device 100 sets the target fuel pressure to a value higher than a valve opening pressure (650 kPa, for example) of relief valve 515. Then in step S5, control device 100 sets the forced valve opening history flag ON. This forced valve opening history flag is read out in step S1 for use in determining the presence or absence of the forced valve opening history. Note that this forced valve opening history flag is cleared at the start or the end of the trip.

Next, in step S6, control device 100 executes valve opening determination processing for relief valve 515. Specifically, control device 100 controls the rotation of feed pump 512 such that the measured value from low-pressure fuel sensor 53a provided on low-pressure delivery pipe 53 exceeds the valve opening pressure. If, however, relief valve 515 is in its normal state, relief valve 515 will open, and so low-pressure fuel sensor 53a will measure the valve opening pressure of relief valve 515. If relief valve 515 is seized and does not open, low-pressure fuel sensor 53a will measure a target pressure higher than the valve opening pressure of relief valve 515. Control device 100 can determine, based on this fuel pressure, whether or not relief valve 515 has been opened. Note that step S6 is optional. Even if step S6 is not performed, seizure of relief valve 515 can be prevented by opening relief valve 515 with a certain frequency (once in one trip, for example).

After the completion of the processing in step S6 or step S7, the processing proceeds to step S8 where the control is returned to the main routine.

As described above, since the processing for opening relief valve 515 is performed when the variation in fuel pressure is small, the variation in fuel pressure when relief valve 515 is opened can be reduced, and thus, deterioration of the air-fuel ratio can be reduced.

In the flowchart shown in FIG. 3, the opening of relief valve 515 is started when the range of variation in engine required power Pe* is small. Thereafter, however, engine required power Pe* may vary significantly while relief valve 515 is open. In this embodiment, therefore, after the forced valve opening processing is started, the vehicle is controlled such that the variation in engine required power Pe* is reduced. Specifically, control device 100, during the execution of opening of relief valve 515, determines required battery charge/discharge power Pb* for battery 70 such that the variation in power Pe* required in engine 10 is restricted.

FIG. 4 is a flowchart for explaining control of reducing the variation in engine required power Pe* during opening of relief valve 515. The processing in this flowchart is invoked by control device 100 shown in FIG. 1 at certain intervals or every time a prescribed condition is met, and then executed.

Referring to FIG. 4, first in step S21, control device 100 calculates required driving power Pr* to be generated by the driving shaft of driving wheel 62, from an accelerator pedal position and a vehicle speed determined by the accelerator pedal operated by a driver. Then in step S22, control device 100 calculates required battery charge/discharge power Pb* from the SOC of battery 70. Required battery charge/discharge power Pb* is set to a positive value when the SOC is lower than a target range, and is set to a negative value when the SOC is higher than the target range.

Then in step S23, control device 100 provisionally calculates engine required power Pe*. Here, engine required power Pe* is calculated in accordance with the equation shown below. In the equation below, Loss represents the energy loss during running of the vehicle, and Pb* has a positive sign in a charge direction and a negative sign in a discharge direction.

$$Pe^* = Pr^* + Pb^* + \text{Loss}$$

Through the foregoing steps S21 to S23, engine required power Pe* at normal times is calculated. In this embodiment, through the subsequent processing from step S24, the control of reducing the variation in engine required power Pe* is executed during the forced valve opening control.

First in step S24, control device 100 determines whether or not the forced valve opening control for relief valve 515 is ongoing. When the forced valve opening control is ongoing, the processing is in step S6 shown in FIG. 3. Here, control device 100 may determine that the forced valve opening control is ongoing when the fuel pressure is set to the valve opening pressure or higher.

When it is determined in step S24 that the forced valve opening control is not ongoing (NO in S24), the processing proceeds to step S27, and engine required power Pe* calculated in steps S21 to S23 is directly used.

On the other hand, when it is determined in step S24 that the forced valve opening control is ongoing (YES in S24), the processing proceeds to step S25. In step S25, control device 100 refers to engine required power Pe* set in a previous processing cycle (previous value), and restricts an increase or decrease in currently set engine required power Pe* (current value). This processing is referred to as smoothing processing, filtering processing, or the like. For example, the processing may be such that a value obtained by adding to the previous value ⅛ of a difference between provisional engine required power Pe* calculated in step S23 and the previous value is set as the current value. Note that other methods for restricting engine required power Pe* may also be used.

After determining the current value of engine required power Pe* restricted in step S25, control device 100 corrects required battery charge/discharge power Pb* in accordance with that value. Since required battery charge/discharge power Pb* can be increased or decreased to some extent within the target range of SOC, an increase or decrease in engine required power Pe* can be reduced to some extent.

For example, when the amount of increase in engine required power Pe* is restricted in step S25, required driving power Pr* and energy loss Loss are unchanged in the equation in step S23, and required battery charge/discharge power Pb* is corrected to decrease by an amount of power corresponding to the restricted amount. For example, when the amount of decrease in engine required power Pe* is restricted in step S25, required battery charge/discharge power Pb* is corrected to increase by an amount of power corresponding to the restricted amount.

After engine required power Pe* is determined in step S25, and then required battery charge/discharge power Pb* is determined in step S26, the processing proceeds to step S27 where the control is returned to the main routine. Control device 100 then controls engine 10 based on determined engine required power Pe*, and controls motor generators 20 and 30 based on determined required battery charge/discharge power Pb*.

Through the processing shown in FIG. 4, the variation in engine required power Pe* is reduced during the forced valve opening control. As a result, the factors responsible for fuel pressure variation decrease, and the range of variation in fuel pressure is reduced even during the execution of the forced valve opening control. Therefore, the stability of air-fuel ratio is improved, and exhaust deterioration can be prevented.

Note that with respect to performing the forced valve opening processing only when the variation in engine required power Pe* is small in FIG. 3, and controlling, after the start of the forced valve opening processing, the vehicle to reduce the variation in engine required power Pe* in FIG. 4, both of them may not be necessarily be performed concurrently, and only one of them may be adopted.

Furthermore, although the internal combustion engine having the in-cylinder injection valves and the port injection valves is shown in FIG. 2 by way of example, the present invention is also applicable to an internal combustion engine only with port injection valves without in-cylinder injection valves.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device for a vehicle equipped with a battery, a motor that receives electric power from the battery to drive the vehicle, and an internal combustion engine,
    said internal combustion engine including:
        a port injection valve that injects fuel into an intake passage;
        a fuel tank that stores the fuel to be injected from said port injection valve;
        a feed pump that sucks the fuel from said fuel tank and supplies the fuel to said port injection valve; and
        a relief valve that is provided along a path from said feed pump to said port injection valve to return the fuel to said fuel tank,
    said control device comprising:
        a fuel pressure sensor that detects a pressure of the fuel supplied to said port injection valve; and
        an electronic control unit that controls said feed pump based on a detected value from said fuel pressure sensor,
    said electronic control unit causing said relief valve to be opened while maintaining operation of said internal combustion engine, in which fuel is injected from said port injection valve, when variation in power required in said internal combustion engine continues to remain within a prescribed range for a prescribed period,
    said electronic control unit, during the execution of opening of said relief valve, restricts the variation in the power required in said internal combustion engine,
    said electronic control unit, during the execution of opening of said relief valve, determines a required charge/discharge amount for said battery in accordance with the restricted variation in the power required in said internal combustion engine.

2. The control device for a vehicle according to claim 1, wherein
    said relief valve is configured to open when a pressure applied to the fuel by said feed pump reaches an opening pressure, and
    said electronic control unit causes said relief valve to be opened by controlling said feed pump such that the pressure of the fuel applied to said relief valve reaches the opening pressure.

* * * * *